US006709012B1

(12) United States Patent
Tanaka et al.

(10) Patent No.: US 6,709,012 B1
(45) Date of Patent: Mar. 23, 2004

(54) GAS GENERATOR

(75) Inventors: Koji Tanaka, Himeji (JP); Takashi Saso, Himeji (JP); Hiroshi Hori, Himeji (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 110 days.

(21) Appl. No.: 10/030,145

(22) PCT Filed: Jul. 27, 2000

(86) PCT No.: PCT/JP00/05010
§ 371 (c)(1),
(2), (4) Date: Jan. 28, 2002

(87) PCT Pub. No.: WO01/07300
PCT Pub. Date: Feb. 1, 2001

(30) Foreign Application Priority Data

Jul. 28, 1999 (JP) .......................................... 11-213104

(51) Int. Cl.[7] .............................................. B60R 21/26
(52) U.S. Cl. ...................................... 280/736; 280/741
(58) Field of Search ................................ 280/735, 736, 280/741, 742; 102/202.9, 202.7

(56) References Cited

U.S. PATENT DOCUMENTS

| | | | | |
|---|---|---|---|---|
| 3,724,870 A | * | 4/1973 | Kurokawa et al. | 280/741 |
| 5,732,634 A | * | 3/1998 | Flickinger et al. | 102/202.5 |
| 5,803,494 A | * | 9/1998 | Headley | 280/741 |
| 5,831,203 A | * | 11/1998 | Ewick | 102/202.5 |
| 5,851,027 A | * | 12/1998 | DiGiacomo et al. | 280/736 |
| 5,934,705 A | * | 8/1999 | Siddiqui et al. | 280/736 |
| 6,019,389 A | * | 2/2000 | Burgi et al. | 280/736 |
| 6,032,979 A | * | 3/2000 | Mossi et al. | 280/741 |
| 6,089,598 A | * | 7/2000 | Snyder et al. | 280/740 |
| 6,166,452 A | * | 12/2000 | Adams et al. | 307/10.1 |
| 6,354,217 B1 | * | 3/2002 | Narumi et al. | 102/202.7 |

FOREIGN PATENT DOCUMENTS

JP 11-48905 2/1999

OTHER PUBLICATIONS

U.S. patent application Ser. No. 09/890,765, filed Aug. 03, 2001, pending.
U.S. patent application Ser. No. 10/030,423, filed Jan. 10, 2002, pending.
U.S. patent application Ser. No. 10/030,145, filed Jan. 28, 2002, pending.
U.S. patent application Ser. No. 10/030,939, filed Jan. 15, 2002, pending.

* cited by examiner

*Primary Examiner*—Paul N. Dickson
*Assistant Examiner*—Toan C To
(74) *Attorney, Agent, or Firm*—Oblon, Spivak, McClelland, Maier & Neustadt, P.C.

(57) ABSTRACT

It is the object of the present invention to provide a gas generator that can provide a controlled expansion and inflation of the airbag with improved reliability. The gas generator D of the present invention is so structured that gas generating agents 7 packed in combustion chambers 3, 4 can be burnt by two ignitors 8, 9 independently of each other, wherein the ignitors 8, 9 electrically ignite ignition agents 26 by use of bridge wires 24 for generating heat by electrifying, and resistance values thereof are differentiated from each other.

6 Claims, 5 Drawing Sheets

GAS GENERATOR

TECHNICAL FIELD

The present invention relates to a gas generator that can provide a controlled expansion and inflation of an airbag by burning gas generating agents in a housing by use of a plurality of ignitors.

BACKGROUND ART

A gas generator that works to expand and inflate the airbag rapidly to protect a vehicle occupant from the impact at a car collision is built in an airbag module fitted in a steering wheel or an instrument panel. The gas generator generates a large amount of gas rapidly by burning the gas generating agents by flames of the ignitors (squibs) ignited by the electrifying from control unit (control circuits).

The conventional gas generator has the mode of expanding and inflating the airbag rapidly at any time that the car collision happens, irrespective of a seating position of a vehicle occupant (a normal seat position or an abnormal seat position such as a stoop-shouldered position, etc.). Thus, the conventional gas generator has the problem of being unable to expand and inflate the airbag in accordance with the seating position of the occupant, such as, for example, the abnormal seat position of the occupant immediately behind the steering wheel or instrument panel.

Therefore, in recent years, there has been proposed and developed a gas generator for inflating the airbag in accordance with the seating position of the occupant, wherein an initial expansion of the airbag is moderated, for example.

As a technique to moderate the initial expansion of the airbag, there is known a gas generator (soft inflator) for expanding and inflating a passenger side airbag.

The proposed gas generator is so designed that an elongate cylindrical housing is partitioned into a plurality of combustion chambers and also the gas generating agents in the respective combustion chambers are burnt independently of each other by the respective ignitors (squibs).

The ignitors (squibs) are operated (ignited by electrifying thereto) with a time difference so that the gas generating agents in the respective combustion chambers are burnt successively. In the initial stage of inflation, the airbag is expanded and inflated gently or moderately by a small amount of gas generated in a first combustion chamber and then, is expanded and inflated rapidly by a large amount of gas generated in the respective combustion chambers.

This can provide a controlled expansion and inflation of the airbag, and as such can allow the airbag to be expanded and inflated in accordance with the seating position of the occupant.

However, in the conventional gas generator in which the gas generating agents are burnt by the plurality of ignitors, the ill-set of the connectors is likely to happen when connecting between the ignitors (squibs) and the control circuits (control units) for controlling the electrifying the ignitors.

The ill-set of the connectors causes the reversed operation of the ignitors (ignition by electrifying) and provides an inadequately controlled expansion and inflation of the airbag and thus reduced reliability.

It is the object of the present invention to provide a gas generator that can provide a controlled expansion and inflation of the airbag with improved reliability.

DISCLOSURE OF THE INVENTION

A gas generator of the present invention is so structured that gas generating agents in a housing are burnt by a plurality of ignitors, that the ignitors electrically ignite ignition agents by use of resistance exothermic bodies for generating heat by electrifying, and that resistance values thereof are differentiated from each other.

This enables the respective ignitors to be discriminated by applying the respective ignitors with weak electric current and measuring resistance value, voltage and the like, whereby the ill-connection can be discriminated and ignitor circuits can be connected properly.

Also, an amount of gas generated can be adjusted by adequately selecting the operation (ignition by electrifying) of the ignitors, whereby a controlled expansion and inflation of the airbag can be provided.

Also, a gas generator of the present invention is so structured that gas generating agents in a plurality of combustion chambers are burnt by a plurality of ignitors independently of each other, that the ignitors electrically ignite ignition agents by use of the resistance exothermic bodies for generating heat by electrifying, and that resistance values thereof are differentiated from each other.

This enables the respective ignitors to be discriminated by applying the respective ignitors with weak electric current and measuring resistance value and voltage, whereby the ill-set can be discriminated and ignitor circuits can be connected properly.

This can provide an adequately controlled expansion and inflation of the airbag, without reversing the operation order of the ignitors and the combustion order in the combustion chambers, and also can provide an improved reliability in the control.

In the present invention, it is possible to differentiate the resistance values of the resistance exothermic bodies by selecting a form or a material thereof.

A difference of resistance value between the respective ignitors is no less than 0.3 [Ω], preferably 0.6 to 2.0 [Ω], whereby the ignitors can be discriminated.

BEST MODE FOR CARRYING OUT THE INVENTION

Description will be given on the embodied forms of a gas generator of the present invention.

The gas generator of the present invention is designed to provide a controlled expansion and inflation of an airbag by burning gas generating agents packed in the housing by use of a plurality of ignitors fitted to the housing.

Also, a gas generator of the present invention is so structured that the ignitors are electrically ignited by electrifying through the resistance exothermic bodies, and that the resistance values thereof are differentiated from each other, thus making the connection between the respective ignitors and the controller reliable, and that the expansion and inflation of the airbag can be controlled.

In the following, the embodied forms of the gas generator of the present invention will be described based on FIGS. 1 to 5.

Figure 5:
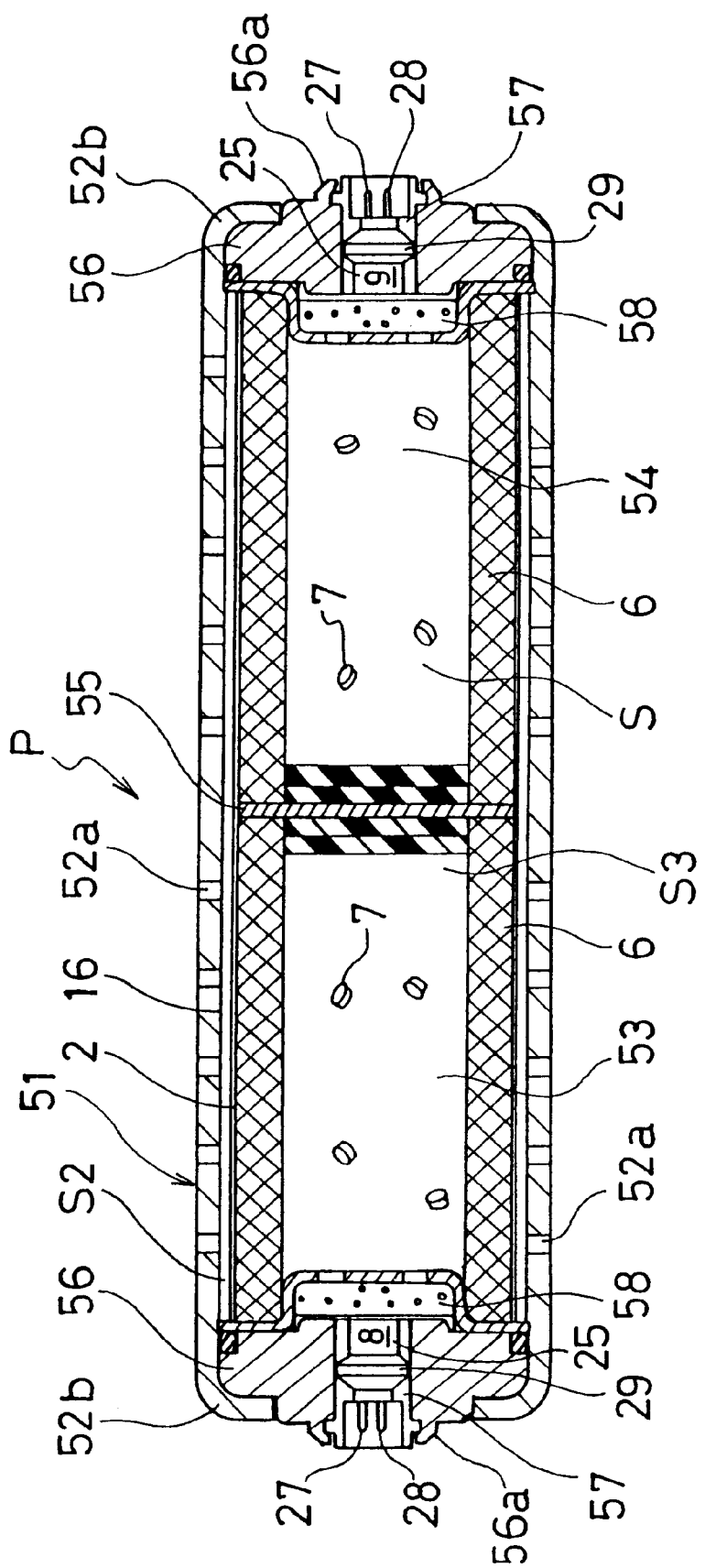
FIG. 5 is a sectional view of a gas generator for inflating an air bag for a passenger seat.

The gas generators of the present invention described herein as examples of use include the one used to expand and inflate the driver-side airbag (FIG. 1) and the one used to expand and inflate the passenger-side airbag or an airbag for a side collision (FIG. 5).

Figure 1:
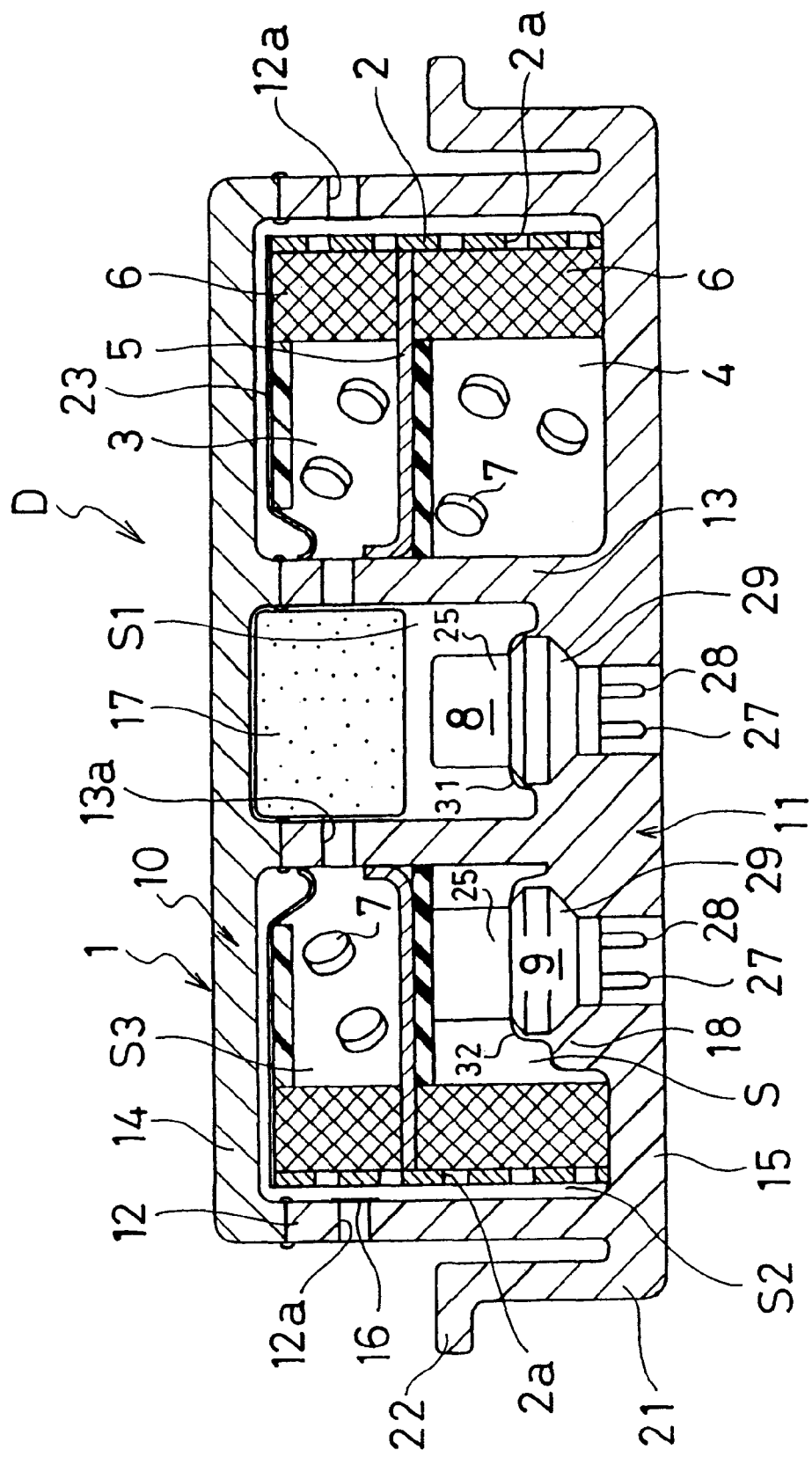
FIG. 1 is a sectional view of a gas generator that works to expand and inflate a driver-side airbag.

The gas generator D as shown in FIG. 1 is used to expand and inflate the driver-side airbag. The gas generator comprises a short cylindrical housing 1, an inner cylindrical member 2 fitted to the housing 1, a partition member 5 for partitioning an inner space of the inner cylindrical member 2 into two upper and lower combustion chambers 3 and 4, filters 6, gas generating agents 7 packed in the combustion chambers 3 and 4, and two ignitors 8 and 9 for burning the gas generating agents 7 packed in the combustion chambers 3 and 4 independently of each other.

The housing 1 has a double cylinder structure formed by an upper casing 10 and a lower casing 11. The housing 1 is so structured that the respective casings 10, 11 are joined to each other by butt welding (e.g. friction welding) so that an outer cylinder 12 and an inner cylinder 13 can be closed at the upper and lower ends thereof by two cover plates 14, 15. Thus, the interior of the housing 1 is partitioned into a closed space S (annular space) between the outer cylinder 12 and the inner cylinder 13 and a space S1 on the inward side of the inner cylinder 13.

The outer cylinder 12 of the housing 1 has a plurality of gas discharge holes 12a formed to communicate between the closed space S and outside (interior of the airbag). The gas discharge holes 12a open in the outer cylinder 12 at an upper end portion thereof (on the upper cover plate 14 side) and are spaced apart at a given interval along a circumferential direction of the housing 1. The gas discharge holes 12a are closed by a burst plate 16 adhered to an inside surface around the outer cylinder 12. The bust plate 16 is formed of a metal foil such as aluminum and serves as moisture-proof and inner pressure adjustment of the housing 1.

The inner cylinder 13 has a plurality of flame spouting holes 13a communicating between the spaces S and S1. The flame spouting holes 13a open in the inner cylinder 13 at a upper end portion thereof (on the upper cover plate 14 side) and are spaced apart at a given interval along the circumferential direction of the housing 1.

The lower cover plate 15 of the housing 1 has a short inner cylinder 18 which is integrally formed to project into the closed space S. The short inner cylinder 18 is located at a position between the outer cylinder 12 and the inner cylinder 13, deviating from the axis of the housing 1 (inner cylinder 13) toward the outer cylinder 12. The lower cover plate 15 has a flanged cylinder 21 formed around its peripheral margin to extend toward the upper cover plate 14 along an outside diameter of the outer cylinder 12. A retainer or equivalent (not shown) of the airbag module (including the airbag and a bag cover) is attached to a flange 22 of the flanged cylinder 21. An inner cylindrical member 2 is fitted in the closed space S in the housing 1.

The inner cylindrical member 2 is produced by forming a metal, such as a perforated metal sheet (punched metal) or an expanded metal, into a cylindrical form. The inner cylindrical member 2 is fitted in a space between the outer cylinder 12 and the short inner cylinder 18 and extends from the lower cover plate 15 to a position close to the upper cover plate 14. The inner cylindrical member 2 is closed at its upper end by a cover plate ring 23 fitted to the periphery of the inner cylinder 13. The space S is partitioned into a gas passage space S2 (annular space) on the outer cylinder 12 side and a combustion space S3 (annular space) on the inner cylinder 13 side by the inner cylindrical member 2. Also, the inner cylindrical member 2 has a plurality of gas passage holes 2a communicating between the respective spaces S2 and S3, which are formed by the punched metal or equivalent.

The combustion space S3 in the inner cylindrical member 2 is partitioned into two upper and lower combustion chambers 3, 4 by the partition member 5. The partition member 5 is press-fitted in the inner cylindrical member 2, so that the combustion chamber S3 is partitioned into the combustion chambers 3, 4 in a predetermined volume proportion. The partition member 5 is fitted to the periphery of the inner cylinder 13, so that it is positioned above the short inner cylinder 18.

The filters 6 are fitted in the combustion chambers 3, 4, respectively, and also the gas generating agents 7 are packed in the combustion chambers. The filters 6 are produced at a low price, for example, by pressing a knitted wire mesh or an aggregation of crimped metal wire rods into cylindrical shape. The filters 6 are fitted in the space between the inner cylindrical member 2 and the short inner cylinder 18, one of which extends from the partition member 5 to the cover plate ring 23 within the combustion chamber 3, and the other of which extends from the lower cover plate 15 to the partition member 5 within the combustion chamber 4. The combustion chambers 3, 4 are packed with the gas generating agents 7 from which high temperature gas is generated by burning. The gas generating agents 7 packed in the combustion chambers are adjusted in amount so that a controlled expansion and inflation of the airbag can be provided.

The ignitors 8, 9 are fitted to the inner cylinder 13 and the short inner cylinder 18 of the housing 1, respectively.

Figure 2:
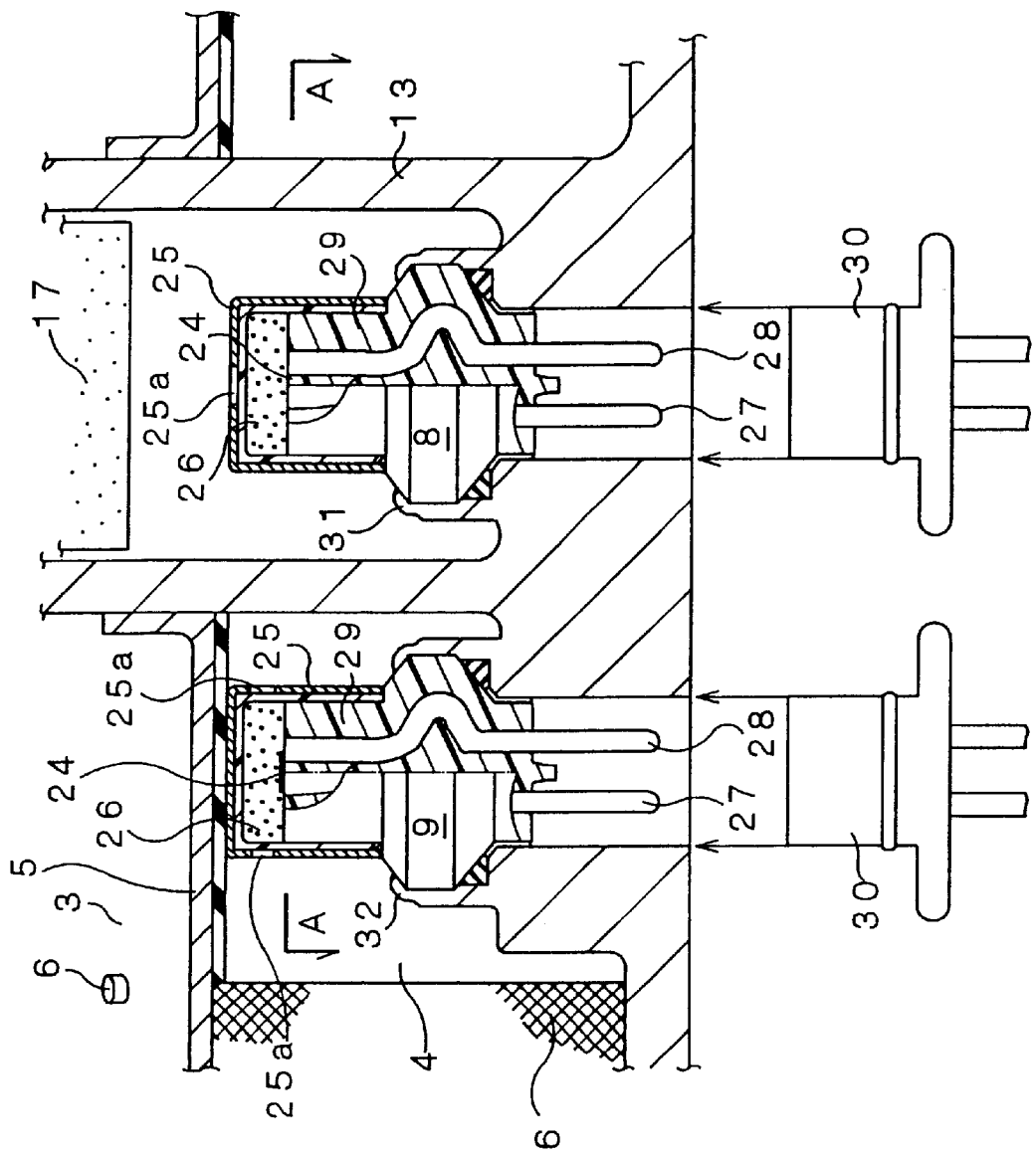
FIG. 2 is an enlarged view of a principal part of the configuration of the ignitors of FIG. 1.

In FIG. 2, the ignitors 8, 9 are presented in the form of pin-type squibs that make ignition agents 26 to be ignited by the passage of electric current through the bridge wires 24 (resistance exothermic bodies).

Each ignitor 8, 9 comprises a cup-shaped tubular member 25, the ignition agent 26 contained in the tubular member 25, lead pins 27, 28 for electrify to a bridge wire 24, and a rod-like plug 29. The bridge wire 24 and the ignition agent 26 are shielded in the tubular member 25 in the press-contacted condition by the plug 29 fittingly inserted in the tubular member 25. The bridge wire 24 is connected to the lead pins 27, 28 in the interior of the tubular member 25, so as to be bridged therebetween. The lead pins 27, 28 extend through the plug 29 from the inside of the tubular member 25 and project out to the opposite side of the tubular member 25. The tubular member 25 has a fire hole 25a formed to communicate between the interior of the tubular member 25 and the outside. The fire hole 25a may be formed as a score which is broken by ignition of the ignition agents 26.

The ignitors 8, 9 are fitted into the inner cylinders 13, 18 from the projecting side of the lead pins 27, 28, respectively, so that the tubular members 25 are projected into the inner cylinder 13 or the combustion chamber 4. The respective lead pins 27, 28 are projected from the inner cylinders 13, 18 to the lower cover plate 15 side to be connected to vehicle-side connectors. The ignitor 8 confronts an enhancer agents 17 in the inner cylinder 13.

Then, the ignitors 8, 9 are fixedly caulked to the inner cylinders 13, 18, respectively, by the caulking projections 31, 32 projecting into the inner cylinder 13 and the combustion chamber 4 being folded radially inwardly.

The respective ignitor 8, 9 can be discriminated (diagnosed) by differentiating the resistance values R [Ω] of the bridge wires 24 (resistance exothermic bodies).

The resistance value R [Ω] of the bridge wire 24 is calculated by $$R = \rho \times (l/S) [\Omega] \quad (1)$$

(on the condition ρ: resistance ratio determined by a material of the bridge wire 24, 1: length of the bridge wire 24, S: sectional area of the bridge wire 24)

Therefore, according to the above equation (1), there are the following 3 cases in which the resistance values [Ω] of the bridge wires 24 are differentiated between the respective ignitors 8, 9.

1̂ As shown in FIG. 3(a), to equalize a material of the respective bridge wires 24 (resistance ratio) to a sectional area (thickness) S and to differentiate length 1 of the respective bridge wires 24.

2̂ As shown in FIG. 3(b), to equalize a material (resistance ratio) to length 1 of the respective bridge wires 24 and to differentiate a sectional area (thickness) of the respective bridge wires 24.

3̂ As shown in FIG. 3(c), to equalize length 1 of the respective bridge wires 24 to sectional area (thickness) S and to differentiate a material (resistance ratio) of the respective bridge wires 24.

It is possible to differentiate the resistance values R [Ω] of the respective bridge wires 24 by properly combining 1̂ to 3̂ above.

In the respective ignitors 8, 9 used for the gas generator D, tolerance of resistance value R [Ω] is ±0.3 [Ω]. The tolerance considered, when the difference of resistance value between the respective ignitors 8, 9 is no less than 0.3 [Ω], preferably no less than 0.6 [Ω], it is possible to discriminate correctly the respective ignitors 8, 9.

If the difference of resistance value between the respective ignitors 8, 9 is too big, there is an adverse possibility that a sensitivity of igniting the ignition agents 25 is lowered and it is required to change a power source of the ignitor circuits to the one having a huge capacity. Therefore, it is most preferable that the difference of resistance value between the respective ignitors 8, 9 is 0.6 [Ω] to 2.0 [Ω].

The respective ignitors 8, 9 get the bridge wire 24 to generate heat by electrifying to the lead pins 27, 28, and the generation of heat causes the ignition agents 26 to be ignited. The flames of the ignition agents 26 are spurted into the inner cylinder 13 and the combustion chamber 4 through the fire holes 25a of the tubular member 25 (See FIG. 2).

Pigtail squibs other than a pin type squibs can be used for the respective ignitors 8, 9. The pigtail squib is formed with lead wires instead of the lead pins 27, 28 shown in FIG. 2 pulling the respective lead wires outside of a housing and mounting gas-generator-side connectors on the tip end of the lead wires. The squib is also connected with a control unit 40 (controller) (See FIG. 4) by connecting gas-generator-side connectors to vehicle-side-connectors.

Figure 4:
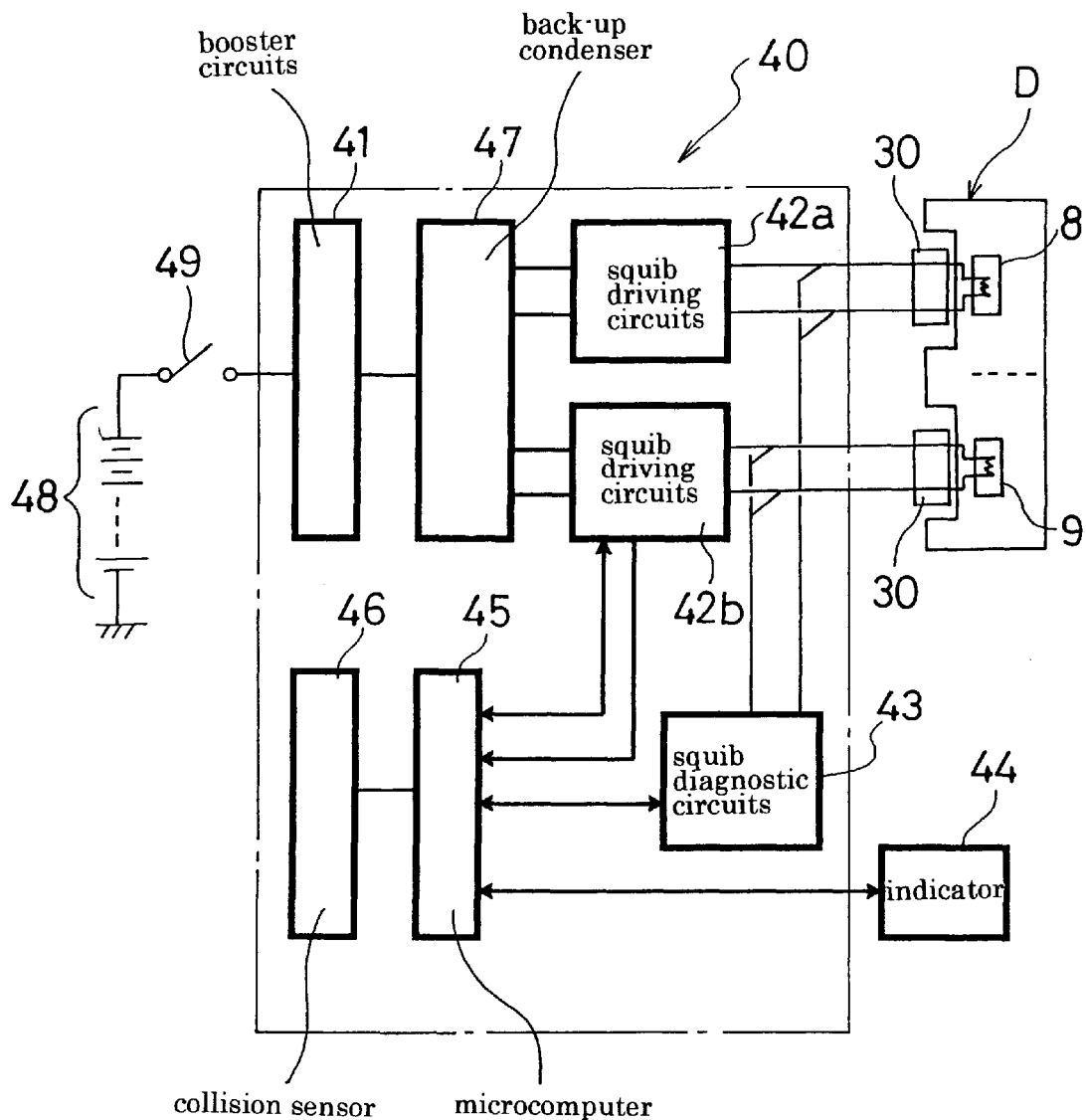
FIG. 4 is a circuit diagram showing a principal part of control unit of an air bag controlling device used for an air bag according to the present invention.

The gas generator D thus constructed is built in an airbag module fitted in the steering wheel and connected with the control unit shown in FIG. 4. The respective ignitors 8, 9 of the gas generator D are connected to vehicle-side-connectors 30 shown in FIG. 2, for example, and connected to a control unit by cables (lead wires) of the connectors 30.

The control unit 40 described above includes a collision sensor (acceleration sensor) 46 for detecting a collision of an automobile, booster circuits 41 for electrifying to the respective ignitors 8, 9 (the bridge wires 24), a back-up condenser 47, a controller formed with squib (ignitor) driving circuits 42a, 42b, and diagnostic circuits for diagnosing disconnection, short circuits and the like, and controls the whole unit with a microcomputer 45.

When the control unit 40 described above is connected with the respective ignitors 8, 9 of the gas generator D and a switch 49 is on, weak electric current (which does not ignite the ignition agents 26) is turned on to the respective ignitors 8, 9 and the respective circuits formed with squib (controller) driving circuits 42a, 42b. The control unit 40 diagnoses a presence of disconnection, for example, by measuring a circuit resistance value [Ω], a circuit voltage [V] and such. At this time, because the resistance values of the respective ignitors 8, 9 are different from each other, a circuit resistance [Ω] formed with a controller and the ignitor 8 and a circuit resistance value [Ω] formed with a controller and the ignitor 9 are different from each other. Therefore, if there occurs an ill-set between the respective ignitors 8, 9 and the controller, resistance value, voltage and the like are heightened or lowered compared to those in the regular case. Thus, the ill-set can be diagnosed by the diagnostic circuits 43.

When there occurs the ill-set of the respective ignitors 8, 9, the diagnostic circuits 43 give feedback to the microcomputer 45 and turn on an alarm light (indicator) 44 to give a notice to operators and the like. The operator connects the respective ignitors 8, 9 with the respective squib circuits 42a, 42b adequately by replacing the respective connectors 30.

The respective ignitors 8, 9 and the controller may be connected after charging the respective of the ignitors 8, 9 beforehand with weak electric current and discriminating (diagnosing) differences of resistance value [Ω], voltage [V] and the like.

The gas generator D connected to the control unit 40 operates as follows. When an automobile collision is detected by the collision sensor, only the ignitor 8 is operated (ignited by electrifying thereto) by the squib driving circuits 42a, to ignite the enhancer agents 17. The ignition flame of the enhancer agents 17 is spurted into the combustion chamber 3 (the upper combustion chamber) from the flame spouting holes 13a to get the gas generating agents 7 to be burnt to thereby produce high temperature gas.

The high temperature gas generated in the combustion chamber 3 flows in the filters 6, first, for slag collection and cooling of the gas thereat, and then flows from the gas passage holes 2a into the gas passage space S2. Then, when the combustion in the combustion chamber 3 proceeds and the pressure in the housing 1 reaches a predetermined pressure, the burst plate 16 is broken, so that clean gas uniformed in the gas passage space S2 is discharged from the gas discharge holes 12a into the airbag (See FIGS. 1 and 5).

This can allow the airbag to start being expanded and inflated modestly by a small amount of gas generated in the combustion chamber 3 only.

Sequentially, when the ignitor 9 is operated (ignited by electrifying thereto) with small time difference from after the start of combustion in the combustion chamber 3 by the squib driving circuits 42b controlled by the microcomputer 45, the ignition flame is spurted into the combustion chamber 4 (the lower combustion chamber) to get the gas generating agents 7 to be burnt to thereby produce high temperature gas.

The high temperature gas produced in the combustion chamber 4 flows into the filters 6, first, for the slag collection and cooling of the gas thereat, and then flows into the gas passage space S2. Then, the gas that flowed into the gas passage space S2 is discharged from the gas discharging holes 12a into the airbag. Thus, the airbag is switched to be expanded and inflated rapidly by a large amount of clean gas discharged from the respective combustion chambers 3, 4 (See FIG. 1).

As a result of this, in the initial stage of inflation, the airbag starts to be expanded and inflated moderately by a small amount of gas generated in the combustion chamber 3 only, first, and then is expanded and inflated rapidly with a short delay by a large amount of gas generated in the combustion chambers 3, 4.

The ignitors 8, 9 are not necessarily operated with the small time delay, but may be selectively operated to meet the patterns of automobile collision.

For example, in the case of a critical collision of automobile, such as a frontal clash or a head-on clash, at high speed, the ignitors 8, 9 are operated (ignited by electrifying thereto) concurrently so that the airbag can be expanded and inflated rapidly by a large amount of gases generated in the combustion chambers 3, 4.

In the case of a medium collision, the ignitors 8, 9 are operated (ignited by electrifying thereto) with a small time delay so that the airbag can be expanded and inflated moderately by a small amount of gas in the initial stage, first, and then is expanded and inflated rapidly with a short time delay by a large amount of gases.

Further, in the case of a light collision, for example, only the ignitor 8 is operated (ignited by electrifying thereto) so that the airbag can take relatively much time to be expanded and inflated moderately by a small amount of gas.

Thus, according to the gas generator D, an amount of gas generated can be adjusted by adequately selecting the operation of the ignitors 8, 9 (the ignition by electrifying thereto), whereby the expansion and inflation of the airbag can be controlled.

By differentiating the resistance value [Ω] of the bridge wires 24 (resistance exothermic bodies) between the respective ignitors 8, 9, it is possible to discriminate the ill-set of the respective ignitors 8, 9 with the controller.

When the respective ignitors 8, 9 are connected with the respective squib driving circuits 42a, 42b, weak electric current is charged by the diagnostic circuits 43. Therefore, it is possible to carry out a diagnosis automatically.

Particularly in a gas generator D for the driver's seat airbag, the ignitors 8, 9 have to be located in the plane of the lower cover plate 15 and thus are susceptible to the ill-connection with the controller caused by the ill-set of the vehicle-side connectors 30. However, it is possible to connect the ignitors reliably by differentiating resistance values [Ω] of the respective bridge wires 24.

Therefore, it is possible to adjust the amount of gas and control expansion and inflation of the air bag without reversing the operation order of the ignitors 8, 9 (the ignition by electrifying thereto). It is also possible to improve the reliability.

As a result, the air bag can be expanded and inflated according to the seated posture of the passenger and its intended function can be fulfilled.

Next, a gas generator P as shown in FIG. 5 is used to expands and inflates a passenger-side airbag or an air bag for a side collision and includes a long cylindrical housing 51, the inner cylindrical member 2 mounted in the housing 51, a partition member 55 for partitioning an inside of the inner cylindrical member 2 into left and right two combustion chambers 53, 54, filters 6 and gas generating agents 7 packed in each of the combustion chambers 53, 54, and two ignitors 8, 9 for independently burning the gas generating agents 7 in the respective combustion chambers 53, 54. In FIG. 5, since the same reference characters refer to the same members as those in FIG. 1 to omit detailed description.

The housing 51 has a single cylinder structure formed by an outer cylinder 52 and two lids 56 fitted to the opposite ends of the outer cylinder 52. The housing 51 has in its interior a closed space S defined by the caulking projections 52b projecting from opposite ends of the outer cylinder 52 being folded along the lids 56 radially inwardly.

The outer cylinder 52 of the housing 51 has a plurality of gas discharge holes 52a formed to communicate between the closed space S and outside (interior of the airbag). The gas discharge holes 52a are spaced apart at a given interval along an axial direction and a circumferential direction of the housing 1. The gas discharge holes 52a are closed by a burst plate 16 (a metal foil such as an aluminum foil) adhered to an inside surface around the outer cylinder 52.

The inner cylindrical member 2 is fitted in the closed space S in the housing 51.

The inner cylindrical member 2 is fitted in the housing 51 throughout its whole width between lids 56, and the closed space S is partitioned into the gas passage space S2 (annular space) on the outer cylinder 52 side and the inner combustion space S3.

The combustion space S3 in the inner cylindrical member 2 is partitioned into two left and right combustion chambers 53 and 54 with the partition member 55. The partition member 55 is press-fitted in the inner cylindrical member 2 in substantially parallel to the lids 56, so that the combustion chamber S3 is partitioned into the combustion chambers 53, 54 in a predetermined volume proportion.

The filters 6 are fitted in the combustion chambers 53 and 54, respectively, and also the gas generating agents 7 are packed therein. Each filter 6 is fitted in the inner cylindrical member 2 and extends throughout its whole width from the lid 56 to the partition member 55 within the combustion chamber 53, 54. The filters 6 in the combustion chambers 53, 54 are packed with gas generating agents 7 from which high temperature gas is generated by burning. The respective quantities of the gas generating agents packed in the combustion chambers are adjusted so that a controlled expansion and inflation of the airbag can be provided.

The ignitors 8, 9 are fitted to the lids 56 of the housing 51, respectively.

Figure 3:
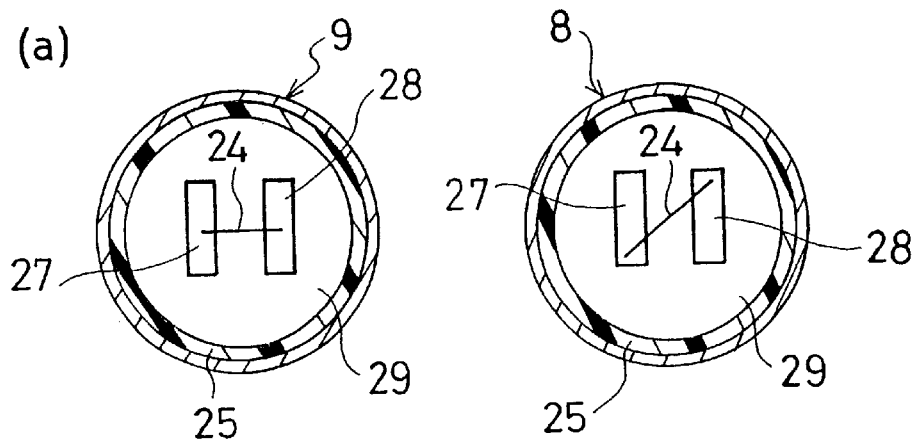
FIG. 3 is a sectional view taken along a line A—A in FIG. 2 and enlarged drawings of a principal part of a structure of a bridge wire.
Figure 3:
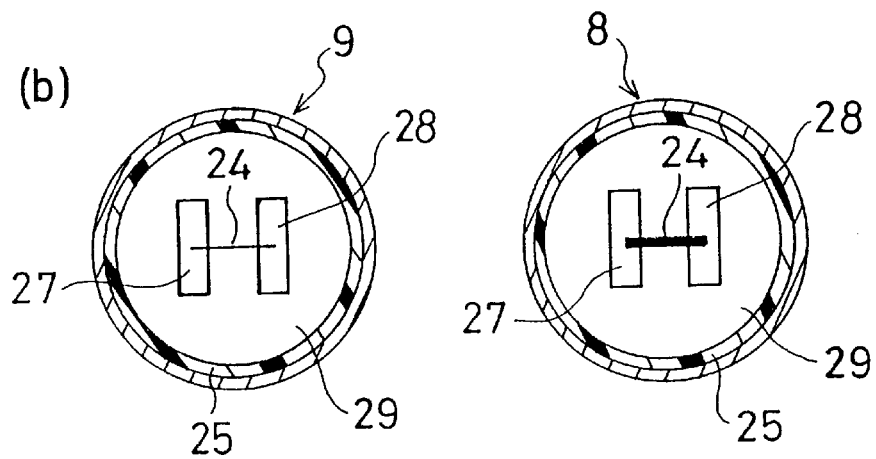
Figure 3:
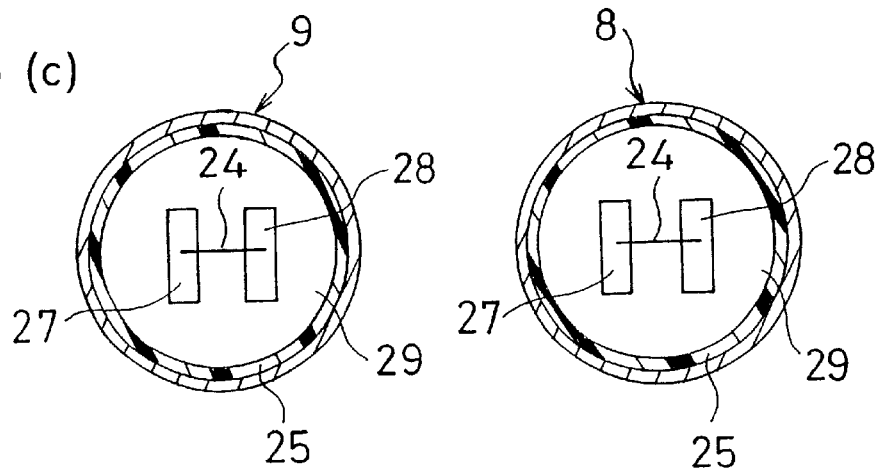

The ignitors 8, 9 are in the form of the same pin-type squibs as those of the gas generator D of FIG. 1 and use the bridge wires 24 (resistance exothermic bodies) having resistance values R [Ω] different from each other (See FIGS. 2 and 3). The ignitors 8, 9 are fitted into the fitting holes 57 of the lids 56 from the tubular member 25 side, respectively, so that the ignitors can confront the enhancer agents 58 packed in the filters 6. Then, the ignitors 8, 9 are fixedly caulked to the lids 56, respectively, by the caulking projections 56a of the lids 56 being folded radially inwardly.

The gas generator P thus constructed is built in an airbag module fitted in the instrument panel and connected with the control unit 40 shown in FIG. 4.

Similarly to the gas generator D in FIG. 1, the diagnostic circuits apply weak electric current. As a result, it is possible to diagnose the ill-set automatically by a difference of circuit resistance value [Ω] and the like of the respective circuits formed with the respective ignitors 8, 9 and the controller.

As the result of this, the controlled expansion and inflation of the airbag in accordance with the seating position of the occupants can be produced.

While the gas generators D, P illustrated above is so structured that the gas generating agents 7 packed in the two combustion chambers 3; 4, 53; 54 can be burnt by the two ignitors 8, 9 independently of each other, an alternative structure may be used wherein the space of the housing 1, 51 is partitioned into three or more combustion chambers so that the gas generating agents packed in those combustion chambers can be burnt by a plurality of ignitors independently of each other.

While the gas generators D, P illustrated is so structured that the space is partitioned into a plurality of combustion chambers 3; 4, 53; 54, an alternative structure may be used wherein the closed space S of the housing 1, 51 is formed as a single combustion chamber, without being partitioned by the partition member 5, 55, so that the gas generating agents packed in that combustion chamber can be burnt by a plurality of ignitors.

Capability of Exploitation in Industry

In a gas generator according to the present invention, the respective ignitors can be discriminated by applying weak electric current thereto and measuring resistance value, voltage and the like and connected adequately preventing an ill-connection with the controller.

Therefore, it is possible to adjust the amount of gas and control expansion and inflation of the air bag without reversing the operation order of the ignitors 8, 9 (the ignition by electrifying thereto). It is also possible to improve the reliability.

It is also possible to differentiate resistance values of the resistance exothermic bodies by selecting a form or a material thereof.

The difference of resistance value between the respective ignitors is no less than 0.3 [Ω], preferably 0.6 to 2.0 [Ω], whereby the ignitors can be discriminated.

What is claimed is:

1. A gas generator comprising a cylindrical housing, gas generating agents, packed in the housing to generate gas by burning, and a plurality of ignitors fitted to the housing for burning the gas generating agents, wherein each ignitor has a resistance exothermic body to generate heat by electrifying and thereby ignite ignition agents, and respective resistance values of the resistance exothermic bodies are different from each other.

2. The gas generator according to claim 1, wherein a difference of resistance value between the resistance exothermic bodies of the respective ignitors is no less than 0.3 Ω.

3. The gas generator according to claim 2, wherein the difference of resistance value is 0.6 Ω to 2.0 Ω.

4. A gas generator comprising a cylindrical housing, a partition member for partitioning an interior space of the housing into a plurality of combustion chambers, gas generating agents packed in the combustion chambers to generate gas by burning, and a plurality of ignitors fitted to the housing for burning the gas generating agents packed in the combustion chambers independently of each other, wherein the each ignitor has a resistance exothermic body to generate heat by electrifying and thereby ignite ignition agents, and respective resistance values of the resistance exothermic bodies are different from each other.

5. The gas generator according to claim 4, wherein a difference of resistance value between the resistance exothermic bodies of the respective ignitors is no less than 0.3 Ω.

6. The gas generator according to claim 4, wherein a difference of resistance value between the resistance exothermic bodies of the respective ignitors is 0.6 Ω to 2.0 Ω.

* * * * *